UNITED STATES PATENT OFFICE.

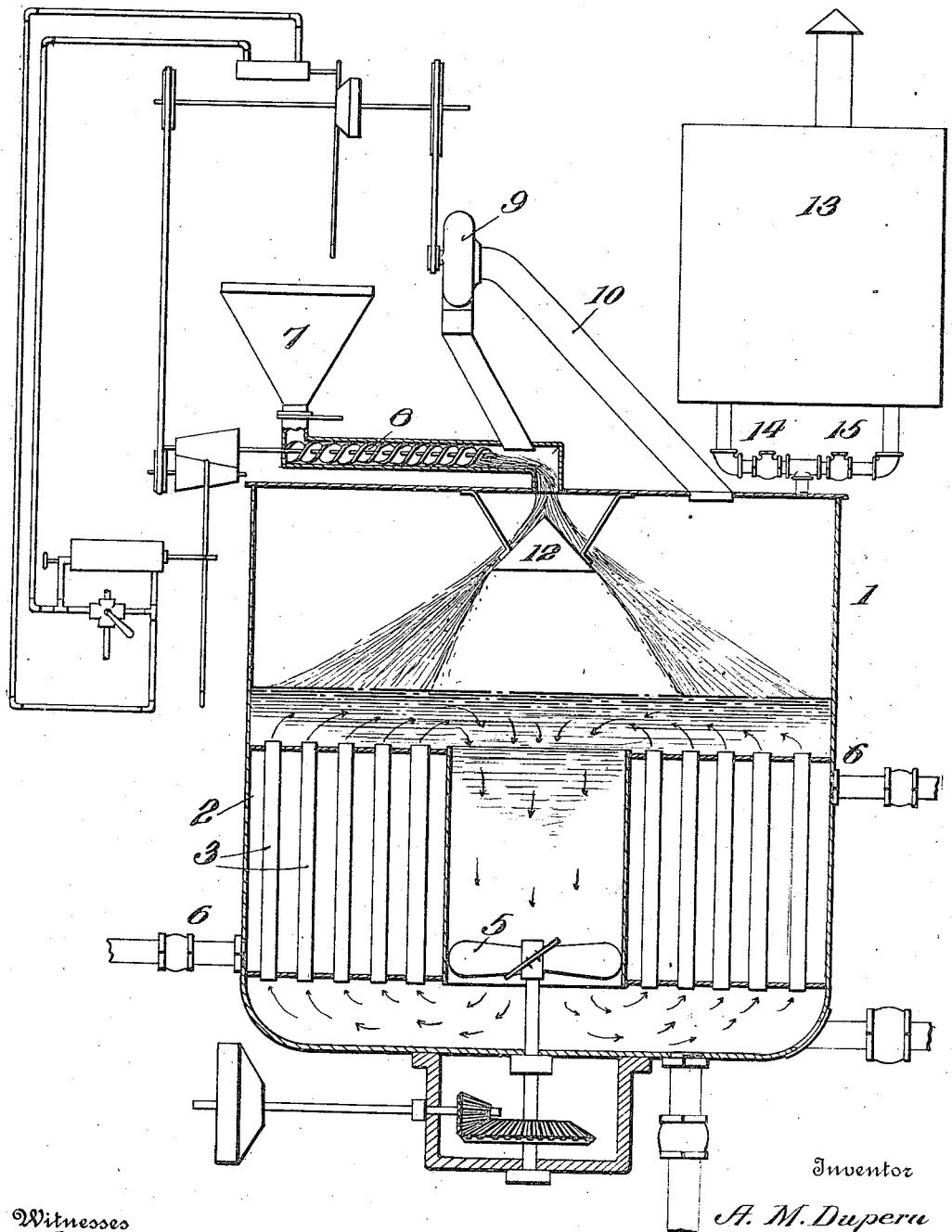

ALPHONSE M. DUPERU, OF OXNARD, CALIFORNIA.

PROCESS OF PRECIPITATING SUGAR.

1,229,190.

Specification of Letters Patent.

Patented June 5, 1917.

Application filed May 20, 1914. Serial No. 839,839.

*To all whom it may concern:*

Be it known that I, ALPHONSE M. DUPERU, of Oxnard, in the county of Ventura and State of California, have invented certain new and useful Improvements in Processes of Precipitating Sugar; and I do hereby declare the following to be a full, clear, and exact description of the invention, such as will enable others skilled in the art to which it appertains to make and use the same.

The object of this invention is to effect economies in the precipitation of sugar from impure aqueous solutions by the use of calcium oxid in the form of powdered lime.

According to my invention the lime previously ground to a fine powder is finely and evenly divided by a strong air current of high velocity and is violently blown in a finely divided state against a comparatively large surface of the aqueous solution which is kept in constant circulation but at a slow speed so as to reduce foaming to a minimum. The circulating air by contacting with the comparatively large surface of the cold solution is cooled thereby, and it, in turn, cools the lime before the latter enters the solution. This greatly reduces the amount of lime necessary to precipitate the sugar, since the colder the lime powder the smaller the quantity required.

In practice, the impure aqueous solution presents a relatively large horizontal surface which is constantly changing under the slow circulation, and this solution is kept at the necessary low temperature by any suitable means. The air is projected at a high velocity by means of a rapidly revolving fan, and such air in taking up the lime divides it into a fine powder and distributes it over the surface of the solution, and preferably against the rising current to thereby prolong the surface contact. The intake of the fan is connected with the top of the receptacle so that the air current will constantly be cooled by the cold solution, and be at a reduced temperature when it contacts with the lime, which latter is fed to the air current at whatever rate is desired.

While it is manifest that the process herein described may be carried out with any preferred form of apparatus, yet in the accompanying drawing I have shown a vertical sectional view of one form of apparatus.

The receptacle 1 is provided with a cooling chamber 2 through which extend pipes 3 and a central passageway 4 wherein is located a pump or propeller 5 which may be driven by known means. The pipe connections 6 are for the admission and discharge of the cooling agent by which the solution is kept at the desired temperature. The width of the receptacle is such that the solution presents a comparatively wide surface above the cooling chamber. The lime is fed from a hopper 7 by means of a screw 8, and at the end of the latter the lime is taken up by the air current created by fan 9, which latter is revolved at a high speed so as to cause the lime to be violently blown into the receptacle in a finely divided state. The intake of the fan is connected by a pipe 10 to the top of the receptacle. Beneath the air and lime inlet, and depending within the receptacle, is a deflector 12, which is located over the central passage 4 so as to distribute the lime over a comparatively large surface of the solution and to preferably engage with the rising current as distinguished from the down current.

An air reservoir 13 is connected to the top of the receptacle, and in the two branch pipes forming the connection are check valves 14 and 15, reversely arranged, to permit of the alternate entrance and discharge of the cold air into the reservoir as the apparatus is charged and discharged.

I have found that it is advantageous to control the blower and the lime feeding mechanism from a common point, and in the drawing I have shown conventional means for accomplishing this purpose, but as such means may be varied at pleasure further reference thereto is unnecessary.

The advantages of my present invention will be readily appreciated by those familiar with the art of precipitating sugar in the form of a saccharate. It will be noted that by maintaining a strong air blast the previously powdered lime may be evenly divided and violently distributed over the cooled impure solution, and by reason of the relatively large surface of the latter the air is continuously cooled and it in turn cools the lime, thereby reducing the quantity required to a minimum. In this way I am enabled to avoid waste and to effect the precipitation in a comparatively short time.

I claim as my invention:

1. The herein described process of precipitating sugar from impure aqueous solutions, consisting in circulating an aqueous solution upward through tubes and downward through a passageway arranged centrally of said tubes, and blowing finely divided lime against the columns of solution issuing upward from said tubes.

2. Apparatus for precipitating sugar from impure aqueous solutions comprising a cylindrical reaction tank, cooling means in said tank, means for circulating an impure aqueous sugar solution in said tank in such manner that the surface of the solution flows from the periphery to the center, and means for directing a stream of finely divided lime against the solution, said stream being directed downward and outward from the center of the tank.

In testimony whereof, I have signed this specification in the presence of two subscribing witnesses.

ALPHONSE M. DUPERU.

Witnesses:
FRANCIS S. MAGUIRE,
MILDRED IMIRIE.